(12) United States Patent
Wang et al.

(10) Patent No.: US 10,598,288 B2
(45) Date of Patent: Mar. 24, 2020

(54) CASCADED CONTROLLABLE FLUID CONTROL VALVE AND VALVE TRIM FOR A FLUID CONTROL VALVE

(71) Applicant: EMERSON PROCESS MANAGEMENT (TIANJIN) VALVES CO., LTD, Tianjin (CN)

(72) Inventors: Bin Wang, TianJin (CN); Qiyong Zhou, TianJin (CN)

(73) Assignee: EMERSON PROCESS MANAGEMENT (TIANJIN) VALVES CO., LTD., Tianjin (CN)

( * ) Notice: Subject to any disclaimer, the term of this patent is extended or adjusted under 35 U.S.C. 154(b) by 0 days.

(21) Appl. No.: 15/241,731

(22) Filed: Aug. 19, 2016

(65) Prior Publication Data

US 2018/0010696 A1    Jan. 11, 2018

(30) Foreign Application Priority Data

Jul. 8, 2016   (CN) .......................... 2016 1 0537481

(51) Int. Cl.
*F16K 47/04* (2006.01)
*F16K 1/44* (2006.01)
*F16K 39/02* (2006.01)
*F16K 3/26* (2006.01)
*F16K 25/04* (2006.01)
*F16K 47/08* (2006.01)

(52) U.S. Cl.
CPC .............. *F16K 1/443* (2013.01); *F16K 3/262* (2013.01); *F16K 3/267* (2013.01); *F16K 25/04* (2013.01); *F16K 39/024* (2013.01); *F16K 47/08* (2013.01)

(58) Field of Classification Search
CPC .......... F16K 47/04–47/08; F16K 1/443; F16K 11/14
USPC ........................................ 137/614.16, 614.17
See application file for complete search history.

(56) References Cited

U.S. PATENT DOCUMENTS

| 1,372,915 | A | * | 3/1921 | Smith | ....................... | B25D 9/14 |
| | | | | | | 137/115.03 |
| 4,149,563 | A | * | 4/1979 | Seger | ......................... | F16K 3/34 |
| | | | | | | 137/625.3 |
| 4,650,155 | A | * | 3/1987 | Liantonio | ................ | F16K 47/04 |
| | | | | | | 251/118 |
| 5,014,746 | A | * | 5/1991 | Heymann | ................ | F16K 47/08 |
| | | | | | | 137/625.3 |

(Continued)

*Primary Examiner* — Marina A Tietjen
*Assistant Examiner* — Paul J Gray
(74) *Attorney, Agent, or Firm* — Marshall, Gerstein & Borun LLP (57) ABSTRACT

A fluid control valve having a body, a seat ring, a valve cage adjacent the seat ring, a first valve plug assembly positioned within the valve cage, and a second valve plug assembly positioned within an axial bore of the first valve plug assembly. The first valve plug assembly has radial apertures in fluid communication with the axial bore and a first valve plug including the axial bore and a throttling port in fluid communication with the axial bore. The first valve plug assembly is movable between a closed position, in engagement with the seat ring, and an open position, spaced apart from the seat ring. The second valve plug assembly has a second valve plug that is movable between a closed position, in engagement with the first valve plug, and an open position, spaced apart from the first valve plug.

20 Claims, 6 Drawing Sheets

(56) References Cited

U.S. PATENT DOCUMENTS

| | | | | |
|---|---|---|---|---|
| 5,228,473 A * | 7/1993 | Zink | ............... | B67D 7/02 |
| | | | | 137/347 |
| 5,564,674 A * | 10/1996 | Kalin | ............... | F16K 31/408 |
| | | | | 251/282 |
| 6,729,351 B2 * | 5/2004 | Bircann | ............... | F16K 1/443 |
| | | | | 123/568.2 |
| 6,772,993 B1 * | 8/2004 | Miller | ............... | F16K 47/08 |
| | | | | 251/333 |
| 6,851,658 B2 * | 2/2005 | Fitzgerald | ............... | F16K 3/243 |
| | | | | 137/625.3 |
| 8,636,021 B2 * | 1/2014 | Hansson | ............... | F16K 1/36 |
| | | | | 137/1 |
| 2010/0148108 A1 * | 6/2010 | Glaun | ............... | F16K 39/024 |
| | | | | 251/324 |
| 2011/0120161 A1 * | 5/2011 | Hayashi | ............... | F25B 41/062 |
| | | | | 62/160 |
| 2015/0129067 A1 * | 5/2015 | Zhan | ............... | F25B 41/062 |
| | | | | 137/614.16 |

\* cited by examiner

CASCADED CONTROLLABLE FLUID CONTROL VALVE AND VALVE TRIM FOR A FLUID CONTROL VALVE

CROSS-REFERENCE TO RELATED APPLICATIONS

This application claims priority to Chinese Patent Application No. 201610537481.9, entitled "Cascaded Controllable Fluid Control Valve and Valve Trim for a Fluid Control Valve" and filed Jul. 8, 2016, the entire disclosure of which is hereby incorporated by reference herein.

FIELD OF THE DISCLOSURE

This disclosure relates generally to fluid control valves and, more particularly, cascaded controllable trim assemblies for fluid control valves.

BACKGROUND

In particular applications, fluid control valves having a high flow control range may be required. For example, a fluid control valve may be required where the pressure drop is large at low flow condition, but small at high flow condition. Traditional fluid control valves cannot meet these requirements, due to the large port size of larger fluid control valves.

One possible way to address these particular application is to use a large fluid control valve with a characterized cage. The cage in these fluid control valves are characterized to be multistage at low travel to resist the high pressure drop at low flow. Because of this, the fluid control valve has to be larger than a typical fluid control valve to provide the large flow control capacity. However, a larger fluid control valve usually has a large port size, so the control valve cannot control low or very low flow.

Another way to address these applications is to use two separated valves. By using two valves, a small valve can be used to control the low flow with high pressure drop and a large valve can be used to control the large flow control with low pressure drop. However, the use of two separated valves increases the cost and space requirements required for a particular installation.

BRIEF SUMMARY OF THE DISCLOSURE

In accordance with one exemplary aspect of the present invention, a fluid control valve comprises a body, a seat ring, a valve cage positioned adjacent the seat ring, a first valve plug assembly positioned within the valve cage, and a second valve plug assembly positioned within the first valve plug assembly. The body defines an inlet, an outlet, and a passageway between the inlet and the outlet and the seat ring is positioned in the passageway. The valve cage is positioned between the inlet and the outlet and includes a plurality of radial openings. The first valve plug assembly comprises a plurality of radial apertures and a first valve plug, which has an axial bore in fluid communication with the radial apertures and a throttling port in fluid communication with the axial bore. The first valve plug is movable between a closed position, in which the first valve plug engages the seat ring, and an open position, in which the first valve plug is spaced apart from the seat ring. The second valve plug assembly is positioned within the axial bore of the first valve plug assembly and comprises a second valve plug that is movable within the first valve plug assembly between a closed position, in which the second valve plug engages the first valve plug, and an open position, in which the second valve plug is spaced apart from the first valve plug.

In further accordance with any one or more of the foregoing exemplary aspects of the present invention, a fluid control valve may further include, in any combination, any one or more of the following preferred forms.

In one preferred form, the plurality of radial apertures are formed through the first valve plug.

In another preferred form, the first valve plug assembly comprises a retainer secured to the first valve plug and a spring positioned within the retainer and between the first valve plug and the second valve plug, wherein the spring biases the second valve plug away from the first valve plug and the plurality of radial apertures are formed through the retainer.

In another preferred form, the spring is isolated from the process fluid.

In another preferred form, the first valve plug comprises a tapered end.

In another preferred form, the second valve plug assembly comprises a valve stem connecting the second valve plug to an actuator.

In another preferred form, the second valve plug comprises one or more apertures therethrough to pressure balance the second valve plug.

In another preferred form, the second valve plug comprises a first portion having a diameter greater than a diameter of the throttling port, a second portion having a diameter smaller than the diameter of the throttling port, and a seating surface to engage the first valve plug with the second valve plug in the closed position.

In another preferred form, the second valve plug comprises a conical portion extending from the second portion and a third portion extending from the conical portion and having a generally cylindrical portion and a planar portion.

In another preferred form, the second valve plug comprises a third portion extending from the second portion and being generally cylindrical and including one or more flutes.

In another preferred form, the first valve plug comprises a plurality of concentric ring-shaped channels axially aligned around the throttling port and the second valve plug comprises a plurality of concentric ring-shaped protrusions configured to be received in respective channels.

In another preferred form, each channel has a width, wherein the width of each channel is smaller than the width of the adjacent channel closer to the throttling port, and the plurality of protrusions each have the same width.

In accordance with another exemplary aspect of the present invention, a trim assembly for a fluid control valve comprises a seat ring, a valve cage positioned adjacent the seat ring, a first valve plug assembly positioned with the valve cage, and a second valve plug assembly positioned within the first valve plug assembly. The valve cage is positioned between an inlet and an outlet of the fluid control valve and includes a plurality of radial openings. The first valve plug assembly comprises a plurality of radial apertures and a first valve plug having an axial bore in fluid communication with the radial apertures and a throttling port in fluid communication with the axial bore. The first valve plug is movable between a closed position, in which the first valve plug engages the seat ring, and an open position, in which the first valve plug is spaced apart from the seat ring. The second valve plug assembly is positioned within the axial bore of the first valve plug assembly and comprises a second valve plug that is movable within the first valve plug assembly between a closed position, in which the second valve plug engages the first valve plug, and an open position, in which the second valve plug is spaced apart from the first valve plug.

In further accordance with any one or more of the foregoing exemplary aspects of the present invention, a trim assembly for a fluid control valve may further include, in any combination, any one or more of the following preferred forms.

In one preferred form, the plurality of radial apertures are formed through the first valve plug.

In another preferred form, the first valve plug assembly comprises a retainer secured to the first valve plug and a spring positioned within the retainer and between the first valve plug and the second valve plug. The spring biases the second valve plug away from the first valve plug and the plurality of radial apertures are formed through the retainer.

In another preferred form, the spring is isolated from the process fluid.

In another preferred form, the second valve plug assembly comprises a valve stem connecting the second valve plug to an actuator.

In another preferred form, the second valve plug comprises one or more apertures therethrough to pressure balance the second valve plug.

In another preferred form, the second valve plug comprises a first portion having a diameter greater than a diameter of the throttling port, a second portion having a diameter smaller than the diameter of the throttling port, and a seating surface to engage the first valve plug with the second valve plug in the closed position.

In another preferred form, the first valve plug comprises a plurality of concentric ring-shaped channels axially aligned around the throttling port, each channel having a width. The width of each channel is smaller than the width of the adjacent channel closer to the throttling port. The second valve plug comprises a plurality of concentric ring-shaped protrusions configured to be received in respective channels, each protrusion having the same width.

DETAILED DESCRIPTION

The example fluid control valves and trim assemblies described herein provide two cascaded controllable plugs, which provide the fluid control valves with a high flow control range in a single, smaller, compact fluid control valve. A first, larger valve plug and a cage can control large fluid flows and a second, smaller valve plug can accurately control small fluid flow. Therefore, the fluid control valves and trim assemblies described herein can provide more accurate control for much smaller fluid flows, due to much smaller port sizes required for the second, smaller valve plug.

Figure 1:
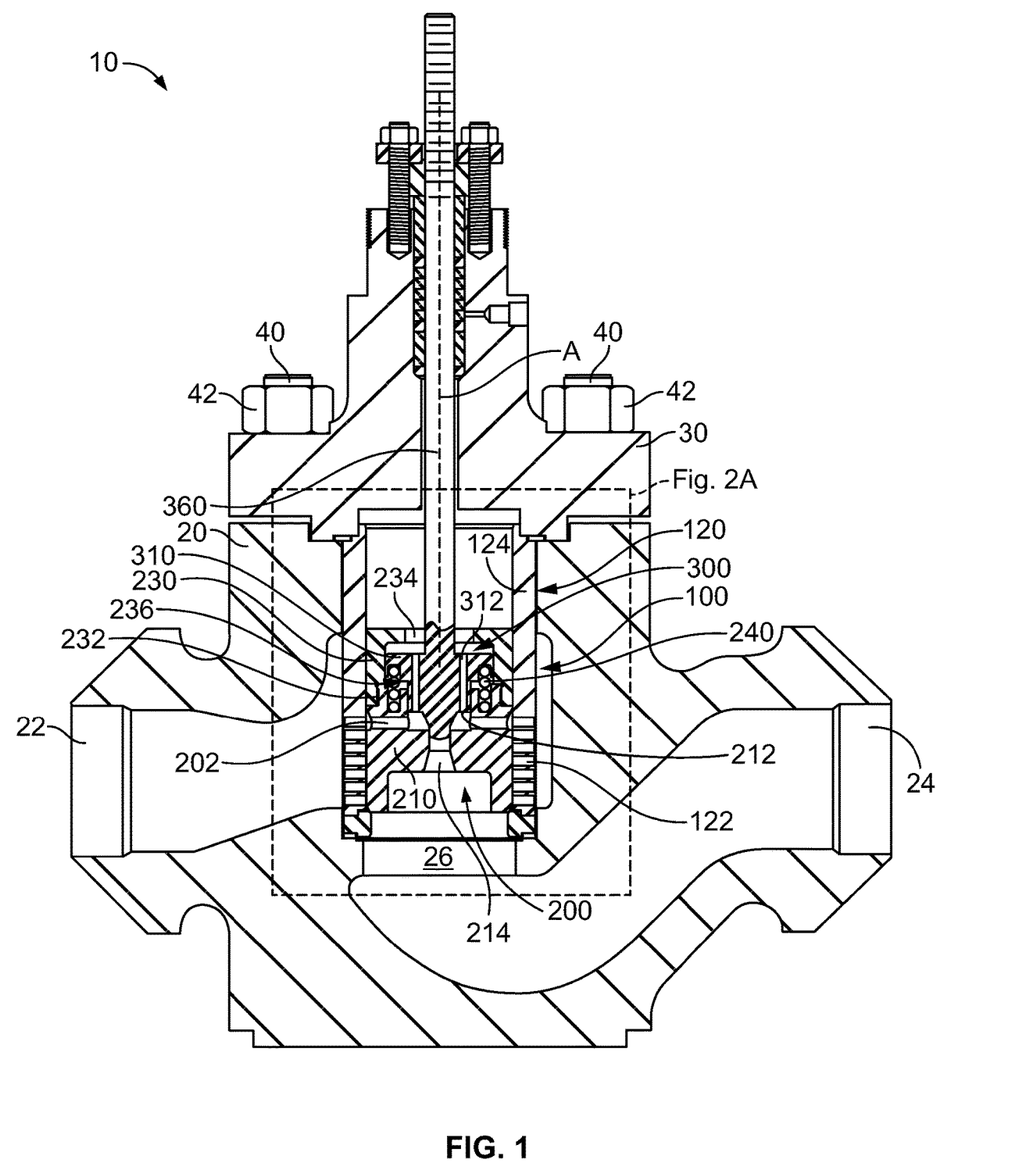
FIG. 1 is a side cross-sectional view of a fluid control valve with an example cascaded trim assembly.
Figure 2A:
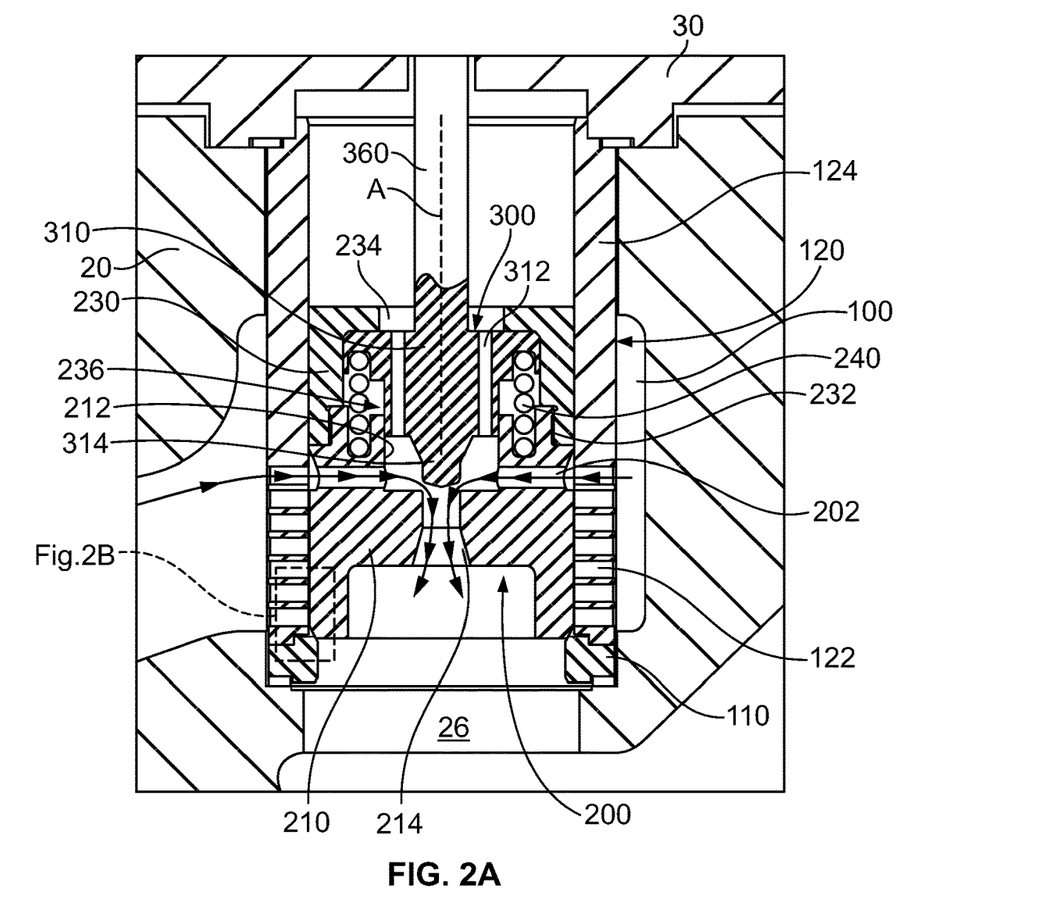
FIG. 2A is an enlarged partial view of the cascaded trim assembly of FIG. 1.
Figure 2B:
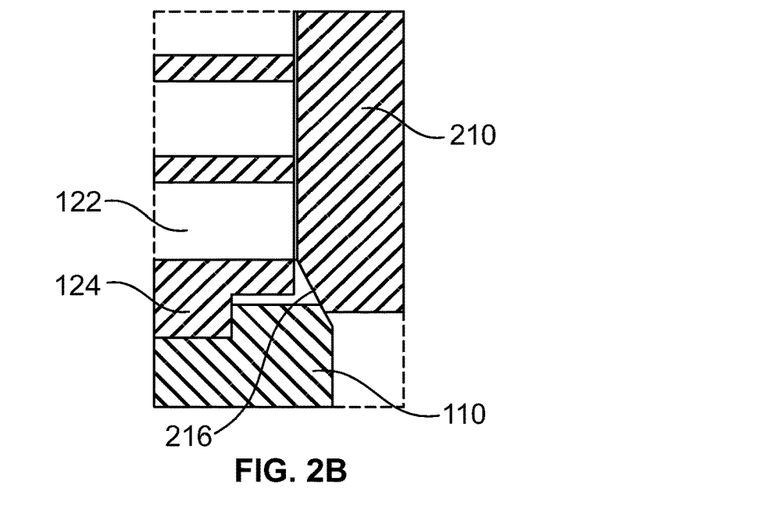
FIG. 2B is an enlarged partial view of a portion of the cascaded trim assembly of FIG. 2A.

Referring to FIGS. 1, 2A, and 2B, one example fluid control valve 10 generally includes a body 20 defining an inlet 22, an outlet 24, and a passageway 26 disposed between inlet 22 and outlet 24. A trim assembly 100 is positioned within body 20 and a bonnet 30 is secured to body 20, for example with threaded members 40 and nuts 42, to retain trim assembly 100 in body 20. Trim assembly 100 generally includes a seat ring 110, valve cage 120, first valve plug assembly 200, and second valve plug assembly 300.

Seat ring 110 is a standard cylindrical or ring-shaped seat ring, which is well known in the art, and is positioned in passageway 26 of body 20, between inlet 22 and outlet 24, to provide a seating surface for engagement with first valve plug assembly 200.

Valve cage 120 is a standard cylindrical cage, which is well known in the art, and is positioned adjacent seat ring 110 between inlet 22 and outlet 24 and can be used to secure seat ring 110 in passageway 26. A plurality of generally radial openings 122 are formed through wall 124 of valve cage 120 to allow the flow of process fluid from inlet 22, through valve cage 120, and to outlet 24. Radial openings 122 can be formed in any size, shape, and/or pattern depending on the particular application.

First valve plug assembly 200 is positioned within valve cage 120 such that first valve plug assembly 200 is movable axially (along longitudinal axis A) within valve cage 120. First valve plug assembly 200 includes first valve plug 210, which is movable between: a closed position (FIGS. 1, 2A, 3A, and 3B), in which first valve plug 210 sealingly engages seat ring 110 and prevents the flow of process fluid through radial openings 122 in valve cage 120; a partially open position (FIG. 3C), in which first valve plug 210 is spaced apart from seat ring 110, allows the flow of process fluid through a portion of radial openings 122 and prevents the flow of process fluid through another portion of radial openings 122; and an open position (FIG. 3D), in which first valve plug 210 is spaced apart from seat ring 110 and allows the flow of process fluid through radial openings 122.

An axial bore 212 is formed into one side of first valve plug 210 and extends longitudinally into first valve plug 210. A throttling port 214 extends longitudinally through first valve plug 210, coaxially with axial bore 212, and is in fluid communication with axial bore 212. In addition, first valve plug assembly 200 includes a plurality of radial apertures 202 that are in fluid communication with axial bore 212. In the example shown in FIGS. 1, 2A, and 2B, radial apertures 202 are formed radially through first valve plug 210. Alternatively, as shown in the example in FIG. 9, radial apertures 202 could also be formed through a retainer of first valve plug assembly 200, rather than through first valve plug 210.

First valve plug assembly 200 can also have a retainer 230 that is secured to first valve plug 210 via threads 232 or any other suitable means. Retainer 230 provides a travel stop for the axial movement of second valve plug 310 and has an opening 234 to receive a valve stem 360 of second valve plug assembly 300, as discussed below. First valve plug 210, retainer 230, and second valve plug 310 together form a cavity 236 that receives a spring 240, or other biasing member. Spring 240 is positioned within retainer 230 and between first valve plug 210 and second valve plug 310 to bias second valve plug 310 away from first valve plug 210 and to isolate spring 240 from the process fluid and keep it out of the flow passage of the process fluid. Keeping spring 240 out of the flow passage of the process fluid avoids influence of spring compression on the flow passage. For example, if spring 240 were in the flow passage, the flow area through spring 240 would decrease as it was compressed. In addition, fluid erosion of spring 240 can be avoided or reduced. When the pressure drop over second valve plug 310 is higher, fluid velocity becomes higher. Keeping spring 240 out of the flow passage avoids high velocity fluid erosion to spring 240, which extends the service life of spring 240. As discussed above, and can be seen in FIG. 9, radial apertures 202 of first valve plug assembly 200 can also be formed radially through retainer 230, rather than being formed through first valve plug 210.

Furthermore, as best seen in FIG. 2B, first valve plug 210 can have a tapered end 216 adjacent the end of first valve plug 210 that engages seat ring 110, to ensure no flow deadband and ensure a smooth transition from the first cascade flow passage through throttling port 214 to the second cascade flow passage formed by valve cage 120 and first valve plug 210, as discussed in more detail below.

Second valve plug assembly 300 is positioned within axial bore 212 of first valve plug 210 such that second valve plug assembly 300 is movable axially (along longitudinal axis A) within axial bore 212 of first valve plug assembly 200. Second valve plug assembly 300 includes second valve plug 310, which is movable within first valve plug assembly 200 between a closed position (FIGS. 1 and 3A), in which second valve plug 310 sealingly engages first valve plug 210 and prevents the flow of process fluid through throttling port 214 of first valve plug 210, and an open position (FIGS. 2A, 3B, 3C, and 3D), in which second valve plug 310 is spaced apart from first valve plug 210 and allows the flow of process fluid through throttling port 214. Second valve plug 310 is guided by the inner diameter of first valve plug 210 and, in some instances, the inner diameter of retainer 230, to ensure concentricity of second valve plug 310 and throttling port 214 and good sealing between second valve plug 310 and first valve plug 210.

Valve stem 360 extends through opening 234 in retainer 230 and through an opening in bonnet 30 to connect second valve plug 310 to an standard actuator (not shown), to move second valve plug 310 between the open and closed positions. Second valve plug 310 can also have one or more apertures 312 that extend longitudinally to pressure balance second valve plug 310 when spaced apart from first valve plug 210 and to pressure balance both second valve plug 310 and first valve plug 210 when second valve plug 310 is spaced apart from first valve plug 210 and first valve plug 210 is spaced apart from seat ring 110, so that second valve plug 310 and first valve plug 210 are easier to control.

Figure 4:
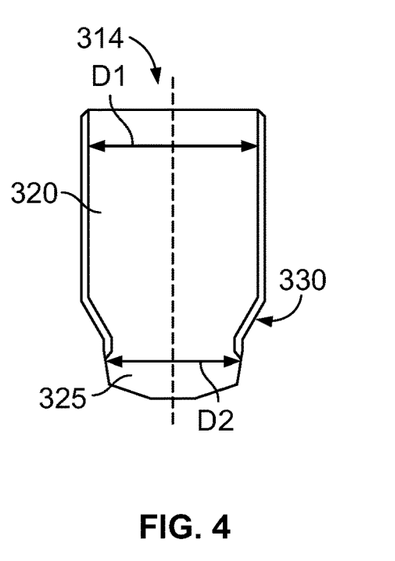
FIG. 4 is an enlarged side view of a portion of the example second valve plug of the second valve plug assembly of FIG. 1.

Referring to FIG. 4, valve tip 314 of second valve plug 310 includes a generally cylindrical first portion 320 having a diameter D1, which is greater than the diameter of throttling port 214. A generally cylindrical second portion 325 has a diameter D2, which is smaller than the diameter of throttling port 214, such that second portion 325 can be received within throttling port 214. A seating surface 330 interconnects first portion 320 and second portion 325 and engages first valve plug 210 with second valve plug 310 in the closed position. In the example shown, seating surface 330 is generally conical. In addition, valve tip 314 and the seating surface of first valve plug 210 engaged by valve tip 314 can be made of a hardened material to avoid erosion of valve tip 314 and first valve plug 210.

Figure 5:
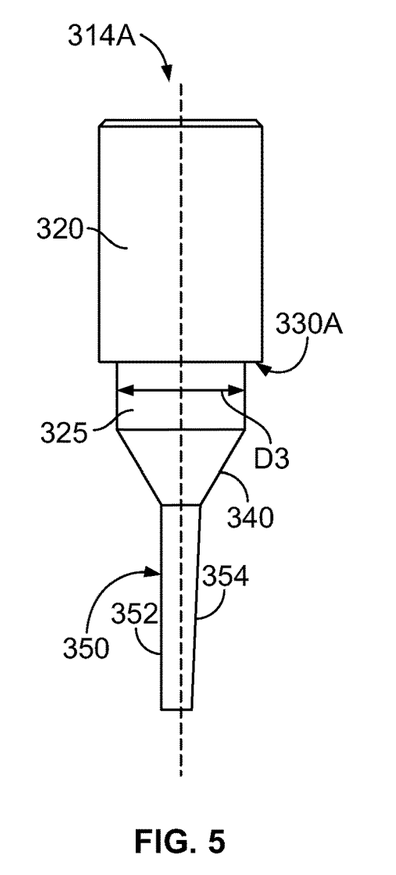
FIG. 5 is an enlarged side view of a portion of another example second valve plug that can be used in the second valve plug assembly of FIG. 1.

To provide more accurate control of very small flows of process fluid through throttling port 214, second valve plug 310 can also be a Micro Tip, or any other kind of tip that can control micro flow, such as valve tip 314A shown in FIG. 5. Similar to valve tip 314, alternative valve tip 314A includes a first portion 320 having a diameter D1 that is greater than the diameter of throttling port 214 and a second portion 325 having a diameter D3 that is smaller than the diameter of throttling port 214. A seating surface 330A interconnects first portion 320 and second portion 325 and engages first valve plug 210 with second valve plug 310 in the closed position. Unlike valve tip 314, seating surface 330A of valve tip 314A is generally perpendicular to first portion 320 and second portion 325. In addition, valve tip 314A includes a conical portion 340 that extends from second portion 325 and into throttling port 214 and a third portion 350 that extends from conical portion 340 and into throttling port 214. Third portion 350 includes a generally cylindrical portion 352 with an angled planar portion 354 extending down cylindrical portion 352. Valve tip 314A allows the flow of the process fluid to be gradually increased as second valve plug 310 is retracted from first valve plug 210.

Figure 6:
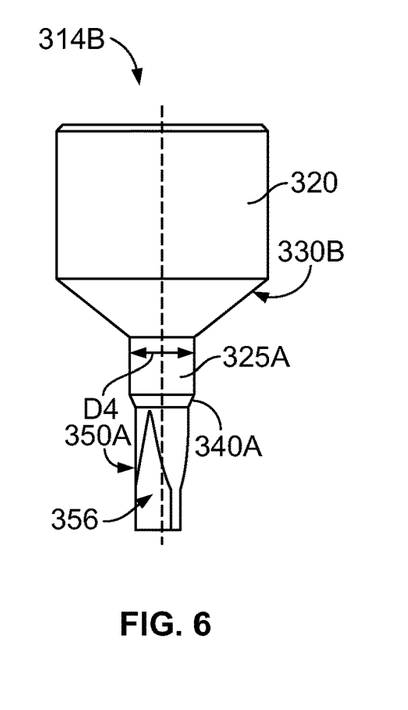
FIG. 6 is an enlarged side view of a portion of yet another example second valve plug that can be used in the second valve plug assembly of FIG. 1.

An alternative Micro Tip is shown in FIG. 6. Similar to valve tip 314, alternative valve tip 314B includes a first portion 320 having a diameter D1 that is greater than the diameter of throttling port 214 and a second portion 325A having a diameter D4 that is smaller than the diameter of throttling port 214. A seating surface 330B is generally conical, interconnects first portion 320 and second portion 325A, and engages first valve plug 210 with second valve plug 310 in the closed position. Unlike valve tip 314, valve tip 314B includes a conical portion 340A that extends from second portion 325A and into throttling port 214 and a third portion 350A that extends from conical portion 340A and into throttling port 214. Third portion 350A is generally cylindrical and includes one or more flutes 356 that can increase in size. Valve tip 314B allows the flow of the process fluid to be gradually increased as second valve plug 310 is retracted from first valve plug 210. As noted above for valve tip 314, valve tip 314B could be made of a hardened or a non-hardened material. In addition, valve tip 314B could be a welded or one piece construction.

In a fully closed position (see FIG. 3A), the actuator moves valve stem 360 toward passageway 26, which moves second valve plug 310 into sealing engagement with first valve plug 210 and moves first valve plug 210 into sealing engagement with seat ring 110. Therefore, process fluid is prevented from flowing from inlet 22 to outlet 24 through radial openings 122 in valve cage 120 and through throttling port 214 in first valve plug 210.

Figure 3A:
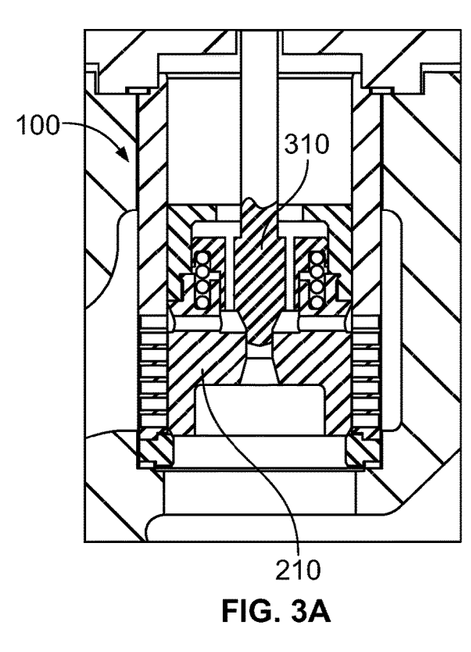
FIG. 3A is a side cross-sectional view of the cascaded trim assembly of FIG. 1 with the first and second valve plug assemblies in a closed position.
Figure 3B:
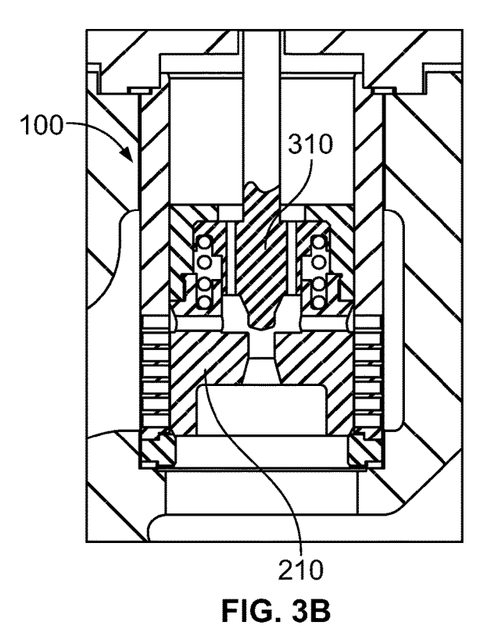
FIG. 3B is a side cross-sectional view of the cascaded trim assembly of FIG. 1 with the first plug assembly in a closed position and the second plug assembly in a fully open position.
Figure 3C:
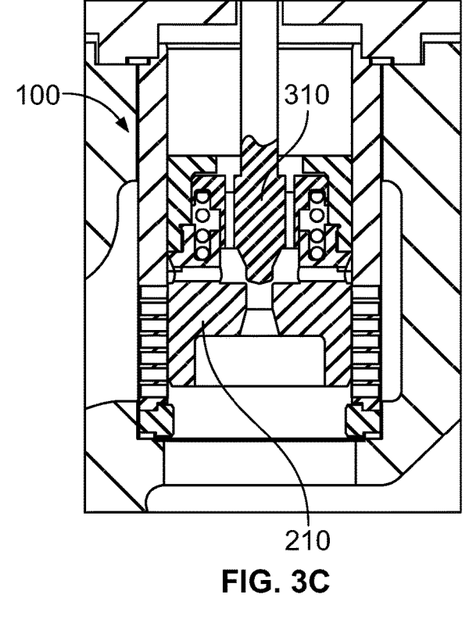
FIG. 3C is a side cross-sectional view of the cascaded trim assembly of FIG. 1 with the first plug assembly in a partially opened position and the second plug assembly in a fully open position.
Figure 3D:
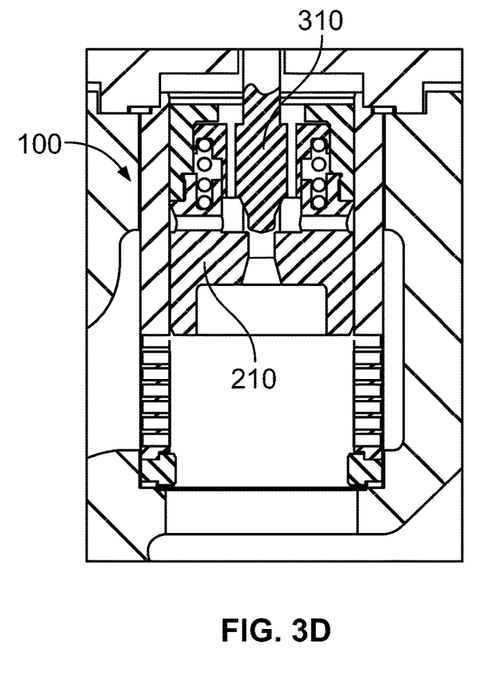
FIG. 3D is a side cross-sectional view of the cascaded trim assembly of FIG. 1 with the first and second plug assemblies in an open position.

A first cascade flow control is achieved as the actuator starts to move valve stem 360 away from passageway 26, which moves second valve plug 310 from a closed position (FIG. 3A) to an open position (FIG. 3B). As valve stem 360 and second valve plug 310 move away from first valve plug 210, spring 240 continues to provide a force between second valve plug 310 and first valve plug 210, which keeps first valve plug 210 is sealing contact with seat ring 110. The spring force required for spring 240 depends on the structure and load required. As shown by the arrows in FIG. 2A, with second valve plug 310 in an open position and first valve plug 210 in a closed position, the process fluid can flow from inlet 22 through a portion of radial openings 122 in valve cage 120 and through radial apertures 202 in first valve plug assembly 200 into axial bore 212. From axial bore 212, the process fluid can flow through apertures 312 in second valve plug 310 to pressure balance second valve plug 310 and through throttling port 214 to outlet 24. The backpressure built up as second valve plug 310 moves away from first valve plug 210 can protect the tip of first valve plug 210 from damage. When second valve plug 310 is fully opened and first valve plug 210 is closed, the process fluid can flow through throttling port 214. The process fluid can build up the back pressure on the downstream portion of the valve, so the pressure drop over first valve plug 210 becomes smaller. Therefore, when first valve plug 210 starts to open, the pressure drop is smaller and the velocity of the process fluid is lower, which reduces fluid erosion to first valve plug 210 and seat ring 110, so the shut off life can be extended.

Once second valve plug 310 is in a fully open position (FIG. 3B), second valve plug 310 contacts the top of retainer 230. Once second valve plug 310 is in contact with the top of retainer 230, continued movement of valve stem 360 and second valve plug 310 away from passageway 26 will also move first valve plug assembly 200 and, therefore, first valve plug 210 away from passageway 26. Second cascade flow control is achieved when first valve plug 210 starts to move away from passageway 26 into a partially open position (FIG. 3C), first valve plug 210 will disengage seat ring 110 and move into a spaced apart relationship with seat ring, which will allow the process fluid to flow directly through another portion of radial openings 122 in valve cage 120, through passageway 26, and to outlet 24. As first valve plug 210 moves away from passageway, the first cascade flow through radial apertures 202 in first valve plug assembly 200 and throttling port 214 will become smaller until completed closed. As first valve plug 210 moves away from seat ring 110, process fluid can flow through throttling port 214 and apertures 312 in second valve plug 310, thereby pressure balancing first valve plug assembly 200 and second valve plug assembly 300 together, which can make them easier to control and allow the use of a smaller actuator.

Valve stem 360 will continue to move first and second valve plug assemblies 200, 300 away from passageway 26 until they reach a rated travel or fully open position (FIG. 3D), for example, when the top of retainer 230 reaches bonnet 30. As first valve plug travels from a partially open position to a fully open position, there will be no flow through the first cascade flow through throttling port 214 and the second cascade flow through radial openings 122 in valve cage 120 will increase to a maximum.

As fluid control valve 10 moves from a fully open position (FIG. 3D) back to a fully closed position (FIG. 3A), first and second valve plug assemblies 200, 300 will first move toward passageway 26 until first valve plug 210 moves into sealing engagement with seat ring 110 (see FIG. 3B). As this happens, flow of the process fluid through radial openings 122 in valve cage 120 is reduced and there is no flow through throttling port 214. During this movement, first and second valve plug assemblies 200, 300 are still pressure balanced.

Once first valve plug 210 is in sealing engagement with seat ring 110, valve stem 360 will continue to move second valve plug 310 towards passageway 26. As this happens, process fluid may can flow from inlet 22 through a portion of radial openings 122 in valve cage 120 and through radial apertures 202 in first valve plug assembly 200 into axial bore 212. From axial bore 212, the process fluid can flow through apertures 312 in second valve plug 310 to pressure balance second valve plug 310 and through throttling port 214 to outlet 24. During this movement, second valve plug 310 is still pressure balanced.

Once second valve plug 310 sealing engages first valve plug 210, flow of the process fluid from inlet 22 to outlet 24 is prevented and the first and second valve plug assemblies 200, 300 are no longer pressure balanced. Therefore, no soft sealing parts are required between first valve plug assembly 200 and valve cage 120. This allows trim assembly 100 to be used in high temperature applications with tight shut off requirements.

Figures 7, 8:
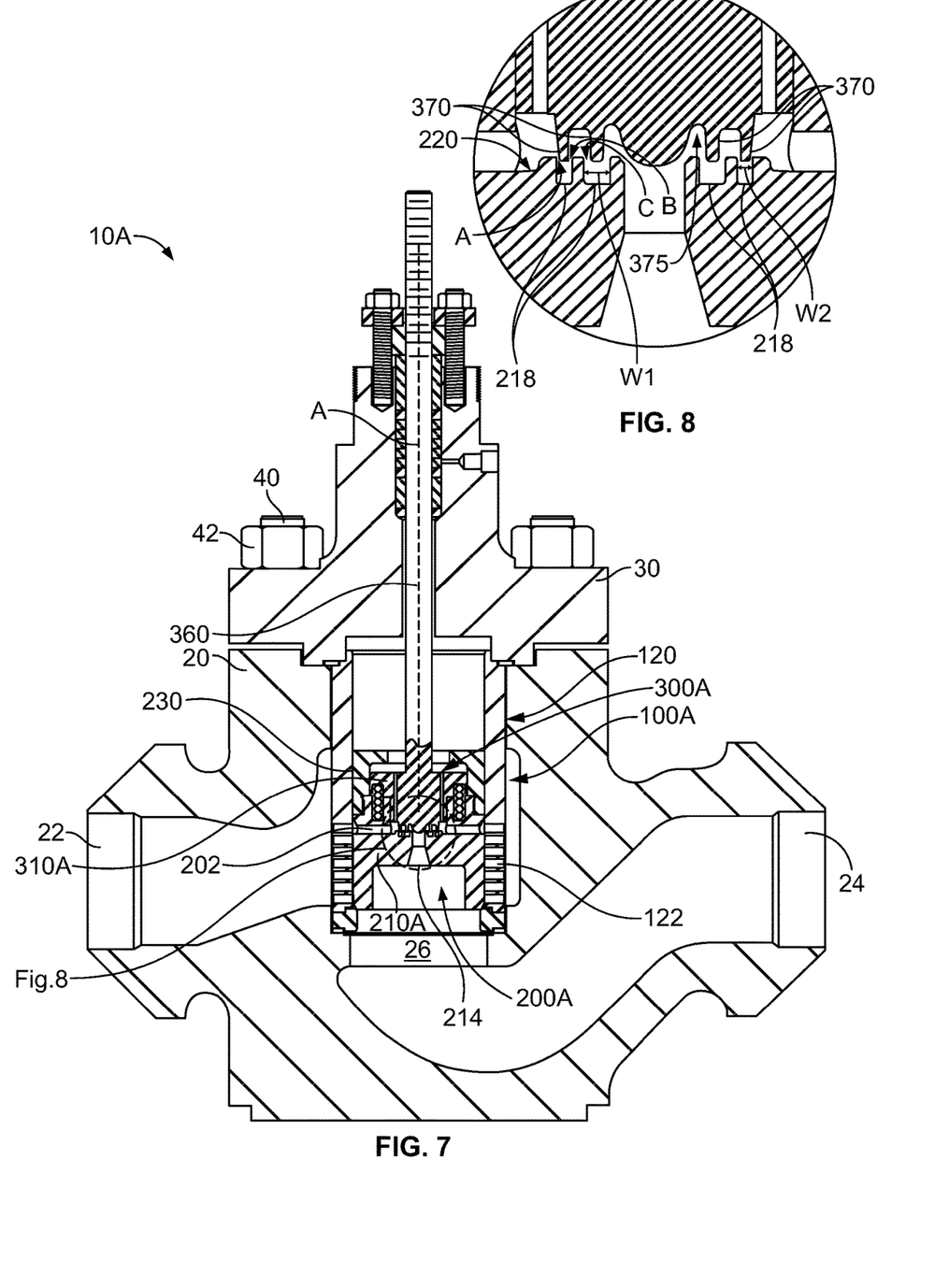
FIG. 7 is a side cross-sectional view of a fluid control valve with another example cascaded trim assembly.
FIG. 8 is an enlarged partial view of a portion of the cascaded trim assembly of FIG. 7.

Referring to FIGS. 7 and 8, another example fluid control valve 10A is shown that can be used for applications having a high pressure drop and low flow. Fluid control valve 10A has the same body 20 and bonnet 30 as fluid control valve 10 described above. In addition, trim assembly 100A of fluid control valve 10A is similar to trim assembly 100 and includes the same seat ring 110 and valve cage 120. While most of the elements of first valve plug assembly 200A and second valve plug assembly 300A are the same as first valve plug assembly 200 and second valve plug assembly 300, the main difference is in the engaging surfaces between first valve plug 210A and second valve plug 310A.

In first valve plug assembly 200A, a surface 220 of first valve plug 210A, which surrounds throttling port 214, includes a plurality of concentric, ring-shaped channels 218, which are axially aligned around throttling port 214. Each channel 218 can have the same width, or, as shown in the example in FIG. 8, the width of each channel 218 can be different. In this particular example, the width of each channel is smaller than the width of the adjacent channel closer to throttling port 214. Therefore, width W1 of channel 218 closest to throttling port 214 is greater than width W2 of channel 218 further away from throttling port 214. A surface 375 of second valve plug 310A also includes a plurality of ring-shaped protrusions 370, which are received is respective channels 218 to assist in providing the sealing engagement between first valve plug 210A and second valve plug 310A. However, unlike channels 218, each protrusion has the same width. Having the widths W1, W2 of channels 218 increase as the channels are closer to throttling port 214 and the widths of protrusions 370 the same forms a multi-stage passage, where the size of the flow passage continues to increase as the process fluid flows toward throttling port 214. In the example shown in FIG. 8, flow passage A would be smaller than flow passage B, which would be smaller than flow passage C. This forms an increasing flow passage area to keep the best pressure drop at each stage.

Figure 9:
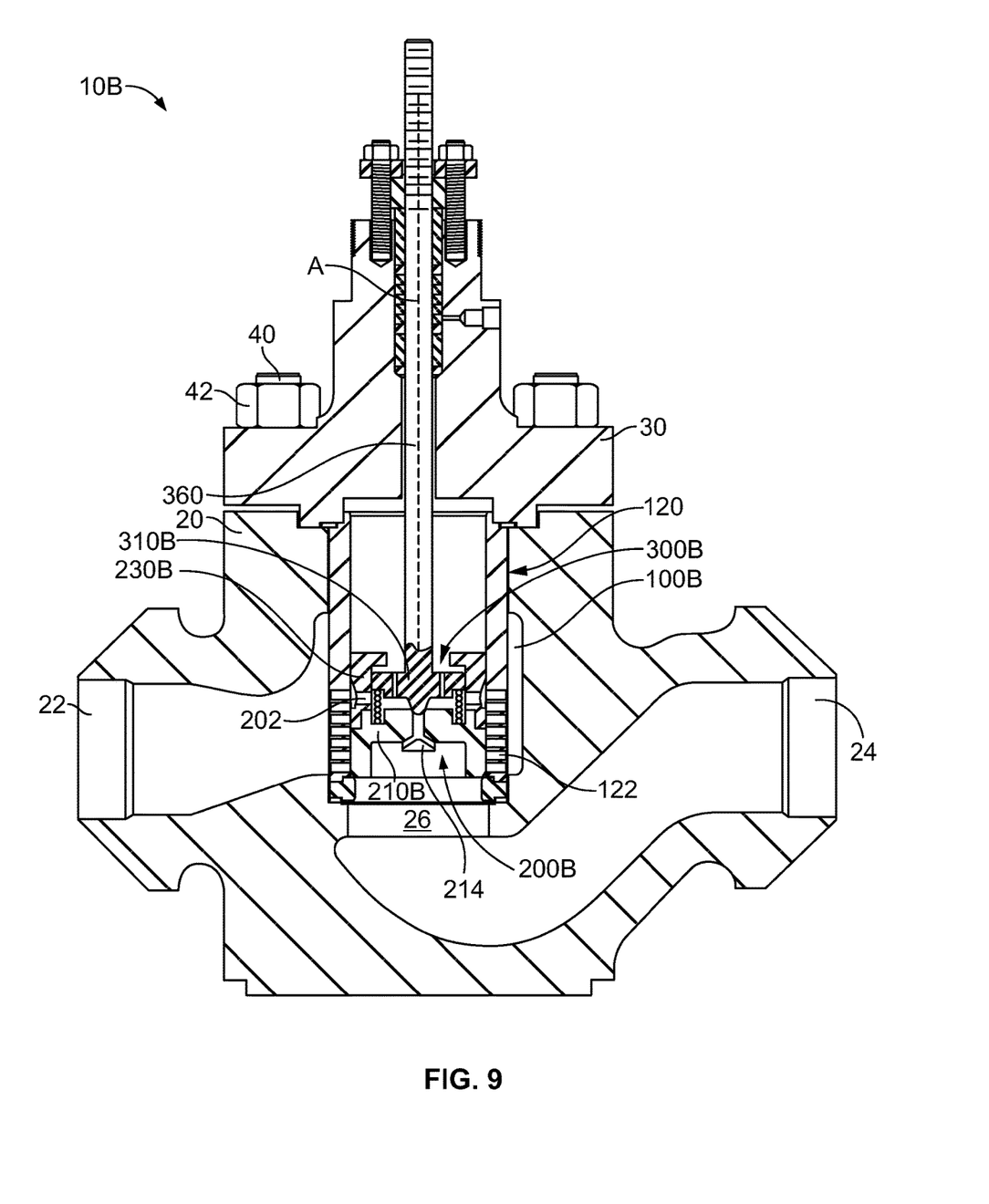
FIG. 9 is a side cross-sectional view of a fluid control valve with yet another example cascaded trim assembly.

FIG. 9 shows another example fluid control valve 10B that provides a simplified design compared to fluid control valve 10. In fluid control valve 10B, radial apertures 202 of trim assembly 100B are formed through retainer 230B of first valve plug assembly 200B, rather than being formed through first valve plug 210B and second valve plug 310B of second valve plug assembly 300B has been simplified so that second valve plug 310B does not block radial apertures 202 when second valve plug 310B is in the closed position, in sealing engagement with first valve plug 210B.

While various embodiments have been described above, this disclosure is not intended to be limited thereto. Variations can be made to the disclosed embodiments that are still within the scope of the appended claims.

What is claimed is:

1. A fluid control valve, comprising:
   a body defining an inlet, an outlet, and a passageway between the inlet and the outlet;
   a seat ring positioned in the passageway;
   a valve cage positioned adjacent the seat ring between the inlet and the outlet, the valve cage including a plurality of radial openings;
   a first valve plug assembly positioned within the valve cage, the first valve plug assembly comprising a plurality of radial apertures and a first valve plug having an axial bore in fluid communication with the radial apertures and a throttling port in fluid communication with the axial bore, wherein the first valve plug is movable between a closed position, in which the first valve plug engages the seat ring, and an open position, in which the first valve plug is spaced apart from the seat ring; and
   a second valve plug assembly positioned within the axial bore of the first valve plug assembly, the second valve plug assembly comprising a second valve plug that is movable within the first valve plug assembly between a closed position, in which the second valve plug engages the first valve plug, and an open position, in which the second valve plug is spaced apart from the first valve plug and allows fluid flow through the radial apertures in the first valve plug assembly and through at least one of the plurality of radial openings in the valve cage with the first valve plug in the closed position; wherein
   the first valve plug assembly comprises a retainer secured to the first valve plug and a spring positioned within the retainer and between the first valve plug and the second valve plug, the spring biasing the second valve plug away from the first valve plug; and
   the spring is isolated from the process fluid by the first valve plug, the second valve plug, and the retainer.

2. The fluid control valve of claim 1, wherein the plurality of radial apertures are formed through the first valve plug.

3. The fluid control valve of claim 1, wherein:
   the first valve plug assembly comprises a retainer secured to the first valve plug and a spring positioned within the retainer and between the first valve plug and the second valve plug, the spring biasing the second valve plug away from the first valve plug; and
   the plurality of radial apertures are formed through the retainer.

4. The fluid control valve of claim 3, wherein the spring is isolated from the process fluid.

5. The fluid control valve of claim 1, wherein the first valve plug comprises a tapered end.

6. The fluid control valve of claim 1, wherein the second valve plug assembly comprises a valve stem connecting the second valve plug to an actuator.

7. The fluid control valve of claim 1, wherein the second valve plug comprises one or more apertures therethrough to pressure balance the second valve plug.

8. The fluid control valve of claim 1, wherein the second valve plug comprises a first portion having a diameter greater than a diameter of the throttling port, a second portion having a diameter smaller than the diameter of the throttling port, and a seating surface to engage the first valve plug with the second valve plug in the closed position.

9. The fluid control valve of claim 8, wherein the second valve plug comprises a conical portion extending from the second portion and a third portion extending from the conical portion, the third portion having a cylindrical portion and a planar portion.

10. The fluid control valve of claim 8, wherein the second valve plug comprises a third portion extending from the second portion, the third portion being generally cylindrical and including one or more flutes.

11. The fluid control valve of claim 1, wherein:
    the first valve plug comprises a plurality of concentric ring-shaped channels axially aligned around the throttling port; and
    the second valve plug comprises a plurality of concentric ring-shaped protrusions configured to be received in respective channels.

12. The fluid control valve of claim 11, wherein:
    each channel has a width, wherein the width of each channel is smaller than the width of the adjacent channel closer to the throttling port; and
    the plurality of protrusions each have the same width.

13. A trim assembly for a fluid control valve, the trim assembly comprising:
    a seat ring;
    a valve cage positioned adjacent the seat ring between an inlet and an outlet of the fluid control valve, the valve cage including a plurality of radial openings;
    a first valve plug assembly positioned within the valve cage, the first valve plug assembly comprising a plurality of radial apertures and a first valve plug having an axial bore in fluid communication with the radial apertures and a throttling port in fluid communication with the axial bore, wherein the first valve plug is movable between a closed position, in which the first valve plug engages the seat ring, and an open position, in which the first valve plug is spaced apart from the seat ring; and
    a second valve plug assembly positioned within the axial bore of the first valve plug assembly, the second valve plug assembly comprising a second valve plug that is movable within the first valve plug assembly between a closed position, in which the second valve plug engages the first valve plug, and an open position, in which the second valve plug is spaced apart from the first valve plug and allows fluid flow through the radial apertures in the first valve plug assembly and through at least one of the plurality of radial openings in the valve cage with the first valve plug in the closed position; wherein
    the first valve plug assembly comprises a retainer secured to the first valve plug and a spring positioned within the retainer and between the first valve plug and the second valve plug, the spring biasing the second valve plug away from the first valve plug; and
    the spring is isolated from the process fluid by the first valve plug, the second valve plug, and the retainer.

14. The trim assembly of claim 13, wherein the plurality of radial apertures are formed through the first valve plug.

15. The trim assembly of claim 13, wherein:
    the first valve plug assembly comprises a retainer secured to the first valve plug and a spring positioned within the retainer and between the first valve plug and the second valve plug, the spring biasing the second valve plug away from the first valve plug; and the plurality of radial apertures are formed through the retainer.

16. The trim assembly of claim 15, wherein the spring is isolated from the process fluid.

17. The trim assembly of claim 13, wherein the second valve plug assembly comprises a valve stem connecting the second valve plug to an actuator.

18. The trim assembly of claim 13, wherein the second valve plug comprises one or more apertures therethrough to pressure balance the second valve plug.

19. The trim assembly of claim 13, wherein the second valve plug comprises a first portion having a diameter greater than a diameter of the throttling port, a second portion having a diameter smaller than the diameter of the throttling port, and a seating surface to engage the first valve plug with the second valve plug in the closed position.

20. The trim assembly of claim 13, wherein:
the first valve plug comprises a plurality of concentric ring-shaped channels axially aligned around the throttling port, each channel having a width, wherein the width of each channel is smaller than the width of the adjacent channel closer to the throttling port; and
the second valve plug comprises a plurality of concentric ring-shaped protrusions configured to be received in respective channels, each protrusion having the same width.

* * * * *

UNITED STATES PATENT AND TRADEMARK OFFICE
CERTIFICATE OF CORRECTION

PATENT NO. : 10,598,288 B2
APPLICATION NO. : 15/241731
DATED : March 24, 2020
INVENTOR(S) : Bin Wang et al.

Page 1 of 1

It is certified that error appears in the above-identified patent and that said Letters Patent is hereby corrected as shown below:

On the Title Page

Item (71), Line 3, "LTD," should be -- LTD., --.

In the Specification

At Column 5, Line 60, "an standard" should be -- a standard --.

At Column 8, Line 7, "may can" should be -- can --.

At Column 8, Line 48, "is respective" should be -- in respective --.

Signed and Sealed this
Eighth Day of December, 2020

Andrei Iancu
*Director of the United States Patent and Trademark Office*